2,726,190

MODIFICATION OF DEXTRAN SYNTHESIS BY MEANS OF ALTERNATE GLUCOSYL ACCEPTORS

Harold J. Koepsell, Nison N. Hellman, and Henry M. Tsuchiya, Peoria, Ill., assignors to the United States of America as represented by the Secretary of Agriculture No Drawing. Application March 11, 1952, Serial No. 276,035

10 Claims. (Cl. 195—31)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates generally to enzyme-induced polymerization syntheses of polysaccharides. It relates particularly to methods for controlling and modifying the enzyme-induced synthesis of dextran whereby novel and improved results are attainable. It relates, more particularly, to the use of certain agencies as additives to the synthesis reaction, which agencies act as acceptors for the glucosyl groups thus exhibiting critical beneficial effects upon the quantity and character of the final polymerized products.

Dextran is a carbohydrate gum of biological origin. It is a polymer of glucose, its molecular weight ranging, in special circumstances, as low as 6,000, and as high as many million. The biological product with which the art is familiar, and which may be termed "native dextran" usually consists of an admixture of high molecular weight dextrans and lower molecular weight dextrans, the former predominating. Both high and low molecular weight dextrans are distinguished from other carbohydrate polymers of glucose by containing a predominance of 1–6 linkages between the anhydroglucose units of the molecule.

Although the mechanism of polymerization which produces dextran is not completely understood, it is known to be enzyme induced, and prior methods have been developed for carrying out dextran synthesis solely by enzymes in the absence of bacterial cells. A method for doing so is described and claimed in application Ser. No. 215,623, filed March 14, 1951, by Koepsell, Kazenko, Jeanes, Sharpe and Wilham. Most prior dextran synthesis methods have involved the utilization of sucrose as a source of the glucosyl groups of the dextran molecule. The reaction appears to involve the formation of some complex of unknown character between the enzyme and the glucosyl group which the enzyme itself has caused to be split from the sucrose molecule. The enzyme glucosyl complex apparently behaves as a carrier agency to deposit the glucosyl group upon a potential dextran molecular unit which may be termed a natural glucosyl acceptor. Thus, the native dextran molecule is built by successive depositions of glucosyl groups on this natural acceptor.

We have discovered a class of compounds which may be termed "alternate glucosyl acceptors" which, if present in an aqueous environment of sucrose and dextransucrase enzyme, act as atypical acceptors of glucose compared with the normal state of affairs encountered in the synthesis of native dextran. Thus, in their presence, novel polysaccharide-like products are formed, usually at the expense of native dextran formation. These alternate glucosyl acceptors appear to comprise two categories; one category of which includes those capable of receiving successive depositions of glucosyl groups, and which may be termed "chain initiators," while the other category includes those capable of receiving only one or a quite limited number of such depositions. Thus the former, i. e., the chain initiating type, is capable of inducing the formation of polysaccharides of increasing degrees of polymerization, the degree of which may be controlled by methods explained in more detail in the following specification. The latter type induces the formation of simple saccharides. Applying the principles of this invention, as will be explained in detail below, we are able to effect alternately the production of oligosaccharides, i. e., polysaccharides containing 2 to 12 mono sugar residues, polysaccharides of a higher degree of polymerization up to those having molecular weights of several thousand and even novel dextran-like products characterized by the presence of the glucosyl acceptor residue. According to our invention, we are able to control the degree of polymerization of our products, particularly in the oligosaccharide range and higher up to products having a molecular weight of around 8,000.

The agencies which bring about the novel results characterizing this invention are certain carbohydrate sugars and sugar derivatives. Although the vast majority of such compounds occurring in nature or produced synthetically appear to have no detectable effect when present in conjunction with sucrose and dextransucrase enzyme, we have, nevertheless, discovered the aforementioned peculiar property possessed by several.

Utilizing our discoveries, we are able to modify the normal enzymic synthesis of native dextran so as to lead to oligosaccharides, polysaccharides, or novel dextrans by the addition of glucosyl acceptors to the synthesis medium. The specific effect of the individual agencies varies somewhat. They are apparently of different degrees of ability to accept glucosyl groups. For example, one of the agencies, the disaccharide, isomaltose, appears to possess this ability to a high degree. The nature of the product to be obtained depends to some extent upon this ability to accept glucosyl groups; those having the higher degrees of ability resulting in more intense competition with native dextran synthesis, and relatively increased production of the novel products which characterize this invention.

As will be seen from the following examples, alternate glucosyl acceptors are characterized generally by a substantial ability to affect the reaction rate of normal dextran synthesis, to affect the yield of native dextran, or to induce the production of oligosaccharides as competitive products in a dextran synthesis environment.

In general, our process is carried out by providing an aqueous medium containing dextransucrase and a suitable alternate glucosyl acceptor, to which is added sucrose. The sucrose is added, preferably gradually to effect substantial deposition of glucosyl groups upon the alternate acceptor in competition with the natural glucosyl acceptor involved in the synthesis of native dextran. In the instance of the chain initiating type of alternate acceptor the competitive reaction may be continued by the addition of sucrose to the reaction mixture, wherein the degree of deposition upon the alternate acceptor molecule is governed by the molecular proportion of sucrose added. Preferably, this addition is also made gradually to minimize local spots of high concentrations and to favor the competitive polymerization. For example, the initial sucrose-glucosyl acceptor ratio conveniently may be within the range of 0.1 to 1.0, although other ratios are operative especially with those alternate acceptors of high activity. The sucrose may then be added until the desired degree of polymerization is accomplished. The products may be recovered from the reaction mixture by alcohol precipitation, dialysis, and other principles familiar to the art relating to the recovery of polysaccharides.

The character of our products depends also upon the relative proportion of acceptor to sucrose in the medium. The higher the proportion the greater the competition with native dextran synthesis and also the more profuse the molecular formation of competing product. Other factors affect the final product, probably the most important being the manner in which sucrose is introduced into the reaction medium. As will be explained in detail below, controlled addition of sucrose affords the production of, alternatively, oligosaccharides or lower polysaccharides; the formation of dextran-like products being not favored or suppressed.

EXAMPLE 1

Test reaction mixtures (10 ml.) containing 0.125 M glucose, 0.125 M auxiliary sugar or sugar derivative as acceptor candidate, 0.02 M acetate buffer at pH 5.0, and purified dextransucrase enzyme sufficient to be 25 units per ml. were set up and incubated at 30° C. In one type of control the auxiliary sugar was omitted, and in the second type the sucrose was omitted. The enzyme was obtained by growing Leuconostoc mesenteroides NRRL B–512 under the conditions disclosed in application Ser. No. 256,586 by Tsuchiya and Koepsell, filed November 15, 1951, and was purified by successive precipitation with alcohol and ammonium sulfate in accordance with procedures customarily employed by those skilled in the art of enzyme purification. The purified enzyme contained 100 dextransucrase units per ml., where one unit is the amount of enzyme which will convert 1 mg. of sucrose to dextran in 1 hr. at pH 5.0 and 30° C.

The rate of enzyme reaction was determined by measuring reducing power liberation at 30 minutes, and final reducing power production was also measured. Reducing power was determined according to the method of Somogyi, Jour. Biol. Chem. 160, 61 (1945) and reducing power was calculated as fructose. Oligosaccharide formation was examined on paper chromatograms at the end of reaction. Dextran yield was measured by alcohol precipitation as follows. An equal volume of absolute ethanol was added to 2 ml. aliquots of each reaction mixture. The precipitated gum was dissolved in 2 ml. of water, reprecipitated, and redissolved at suitable strength for polarimetric dextran determination. Formamide was used to dispel opalescence if necessary to reduce the turbidity for polarimetry. Results were calculated on the basis that B–512 dextran has an $[\alpha]_D^{20}$ of $+200°$ in water and of $+215°$ in formamide at the dextran concentrations read.

Oligosaccharide formation, as a result of enzyme reaction, was determined as follows. The alcohol supernatant liquids from the first precipitation of dextran were spotted on triplicate sheets of filter paper. The sheets were irrigated by the solvent-descent technique with a solvent containing 3 volumes of normal butanol, 2 volumes of pyridine and 1 volume of water, as described by Jeanes, Wise and Dimler, Anal. Chem. 23, 415 (1951). After drying, individual sheets were sprayed with (a) an aqueous ammoniacal silver nitrate solution, or with (b) alkaline 3,5-dinitrosalicylic acid which is also described by the aforementioned authors for the detection of reducing sugars; or with (c) dilute urea-phosphoric acid solution as described by Hough, Jones and Wadham in J. Chem. Soc. 1950, 1702, as modified by Dimler for the detection of fructose-containing sugars. Spots indicating the locations of sugars appeared on the sheets upon heating. Standard solutions of known sugars were spotted to provide reference spots.

The paper chromatograms indicated formation in all sucrose-containing reaction mixtures of a disaccharide, leucrose, which is a fructoglucoside. A second reducing sugar, as yet unidentified, was also present. This sugar gave a blue color with urea-phosphoric acid reagent, as is characteristic of fructose-containing sugars.

None of the auxiliary sugars or sugar derivatives tested as glucosyl acceptors were attacked by the enzyme in the absence of sucrose.

Isomaltose, maltose, alpha-methyl glucoside, glucose, fructose, leucrose, melibiose, and galactose were found to be alternate glucosyl acceptors, since they affected either reaction rate, or yield of native dextran, or effected the production of oligosaccharides. The effects on reaction rate and yield of native dextran are given in Table I.

Isomaltose approximately doubled the reaction rate. The reaction mixture remained perfectly clear and non-viscous, and the yield of normal native dextran was very low. However, chromatograms of the reaction mixtures showed heavy production of a series of oligosaccharides whose sugars coincided with those obtained in the hydrolysis of dextran. It appeared that the oligosaccharide series produced was the ascending α-1,6 glucopyranosidic series, and that normal dextran synthesis had been diverted to major formation of these oligosaccharides. Decrease in the intensity of isomaltose spots before and after reaction indicated that isomaltose had been used in the reaction by initiating chain formation.

Maltose sharply increased the reaction rate and depressed the dextran yield. No opalescence or appreciable increase in viscosity occurred. Intensity of the maltose spot decreased as a result of reaction, and a series of oligosaccharides was again produced as a major product. The series differed, however, from that formed in the sucrose-isomaltose reaction mixture. The trisaccharide spot coincided with panose (4-α-isomaltopyranosyl-D-glucose). This sugar would be the product if a glucosyl radical were deposited by the α-1,6 glucopyranosidic dextran linkage on the non-reducing glucose moiety of maltose. The other oligosaccharides evident in the reaction mixture bore the same relationship to equivalent sugars of the dextran oligosaccharide series as panose does to isomaltotriose.

Glucose accelerated the reaction, but to a lesser extent than either maltose or isomaltose, and had little effect on dextran yield. However, an oligosaccharide series was again detectable readily but was present in smaller amounts. The series coincided with the dextran hydrolysate series, as would be expected if glucose were an alternate glucosyl acceptor and also initiated chain formation.

α-Methylglucoside increased reaction rate and decreased dextran yield. A new series of spots was evident on papers sprayed with silver nitrate but not on those sprayed with dinitrosalicylic acid. It appeared that α-methylglucoside initiated formation of a series of non-reducing oligosaccharide derivatives having the obvious relationship to the dextran series of sugars.

Fructose as auxiliary sugar differed from the four previous acceptors in decreasing, rather than increasing, reaction rate. There was little effect on dextran yield. The paper chromatograms indicated that there had been considerably greater formation of both leucrose and the fructose-containing disaccharide coinciding with maltose. There was only slight increase in the amounts of higher oligosaccharide. Leucrose itself did not affect reaction rate or dextran yield, but had a definite though minor effect on oligosaccharide production.

Melibiose as auxiliary sugar caused a decrease in reaction rate without major effect on dextran yield. The chromatograms, however, indicated moderate production of a reducing sugar appearing below melibiose and presumed to be a trisaccharide. No other oligosaccharides were present in appreciable amounts. Galactose affected only oligosaccharide production to any degree, and the effect was small.

TABLE I

*Effects of auxiliary sugars on dextran synthesis*

| Auxiliary sugar | Reducing power [1] | | Dextran yield [2] |
|---|---|---|---|
| | 30 min. | Final | |
| | mg./ml. | mg./ml. | mg./ml. |
| None | 6.5 | 22.8 | 19 |
| Isomaltose | 12.8 | 22.8 | 3 |
| Maltose | 10.8 | 21.4 | 5 |
| α-Methylglucoside | 8.6 | 21.8 | 11 |
| Glucose | 7.1 | 24.5 | 17 |
| Fructose | 5.4 | 22.2 | 18 |
| Leucrose | 5.9 | 19.6 | 19 |
| Melibiose | 5.6 | 21.2 | 17 |
| Galactose | 6.2 | 23.8 | 17 |

[1] Corrected for auxiliary sugar. Theoretical final value is 22.8 mg.
[2] Theoretical yield is 20 mg.

EXAMPLE 2

This example illustrates the use of a glucosyl acceptor in the production of unusual polysaccharides and dextrans differing from normal dextran in the nature of the disaccharide moiety, constituting the reducing end of the molecule. The products obtained may be named "maltodextrans" in apparent admixture with normal dextran. The product was produced in a range of molecular sizes.

The synthesis was conducted by adding sucrose in small increments to a solution (100 ml.) containing maltose (5 percent) and dextransucrase enzyme (50 units per ml.) in 0.02 M acetate buffer at pH 5.0 and 30° C. As disclosed in copending application of Koepsell, Tsuchiya and Hellman, filed March 11, 1952, and issued November 24, 1953, as U. S. Patent No. 2,660,051, the presence of sucrose at concentrations above 30 percent on a weight/volume basis leads per se to appreciable formation of low molecular weight dextran in normal synthesis, and care was taken to insure that the concentration of total carbohydrate was kept below this critical level at all times by diluting with water as necessary. The enzyme concentration was maintained essentially constant by fresh additions as needed. The pH was maintained at 5.0 and toluene was added as a preservative.

Oligosaccharide production was examined during the early stages of sucrose addition by precipitating the small amounts of native dextran present at 50 percent alcohol and spotting the supernatant liquids on paper chromatograms, as described in Example 1. The growth process at the oligosaccharide stage of maltodextran synthesis was obvious from the fact that a sequence of oligosaccharides was present, and that successive higher members of the series disappeared from the reaction mixture during the course of reaction. The non-coincidence of the individual members of the oligosaccharide series with spots of oligosaccharides obtained by hydrolyzing the usual dextran indicated that the oligosaccharide series differed in composition from the normal dextran series. For example, the location of the trisaccharide formed did not coincide with isomaltotriose, but coincided instead with 4-α-isomaltopyranosyl-D-glucose, also called panose, a sugar which would be expected to have been produced if a glucosyl radical had been added to maltose in substitution for the hydroxyl group normally located on carbon atom number 6 of the non-reducing glucose moiety of maltose. The location of successive members of the oligosaccharide series detected in the reaction mixture indicated that successive additions of glucosyl radicals progressively to the number 6 carbon atom of the sugars in this series had occurred. These observations proved that maltose as an alternate acceptor initiates chain formation in dextran synthesis and that the products observed were those preceding the formation of maltodextran.

The deep intensity of the individual spots of the oligosaccharide series indicated that the oligosaccharides were the major components of the reaction products. The intensity of spots of the individual sugars of the series indicated that the reaction could be conducted so as to bring about the production of any given oligosaccharide as predominant product. For example, panose was the major product when the ratio of sucrose to maltose attained a value of 1 to 2, while the tetrasaccharide was the predominant product when the ratio had a value of 2 to 4. Higher members of the oligosaccharide series were predominant at sucrose to maltose ratio values approximating 2 less than the number of monosaccharide moieties constituting the oligosaccharide.

The synthesis reaction was continued by further additions of sucrose until sucrose to maltose ratio values up to 9600 had been attained. Aliquots of the reaction mixture were examined periodically in the ultra centrifuge to determine the molecular weight of the carbohydrate polymers present. The data are presented in the following table.

TABLE II

| Ratio of Sucrose concentration Maltose concentration | Molecular weights at given sucrose concentration (concentration given as g./100 ml. solution) | | | | |
|---|---|---|---|---|---|
| | 10 | 15 | 20 | 25 | 30 |
| 38.5 | 4,600 | 6,000 | — | — | — |
| 75 | — | — | 4,900 | 11,000 | — |
| 150 | 7,400 | 13,000 | — | 16,400 | 19,000 |
| 600 | — | — | 15,400 | 15,900 | 13,500 | 16,900 |

The products of this invention are useful as intermediates in condensation and polymerization reactions, as for example, as starting materials for the subsequent addition of glucosyl units in the production of higher molecular weight dextran-like products. They are also useful as plasticizers, ingredients in coating compositions and as intermediates for the preparation of pharmaceutical products.

We claim:

1. The method of producing polyglucose products having a molecular weight up to about 8,000, comprising subjecting an aqueous solution of sucrose to the action of dextransucrase in the presence of an organic compound of the group consisting of isomaltose, maltose, alpha-methyl glucoside, glucose, fructose, leucrose, melibiose, and galactose and recovering a polysaccharide product other than native dextran from the reaction mixture by precipitation with alcohol.

2. The method of producing polyglucose products having a molecular weight up to about 8,000, comprising subjecting an aqueous solution of sucrose to the action of dextransucrase in the presence of an organic compound of the group consisting of isomaltose, maltose, alpha-methyl glucoside, glucose, fructose, leucrose, melibiose, and galactose and recovering a polysaccharide product other than native dextran from the reaction mixture.

3. The method of claim 2 in which the organic compound is isomaltose.

4. The method of claim 2 in which the organic compound is maltose.

5. The method of claim 2 in which the organic compound is alpha-methyl glucoside.

6. The method of claim 2 in which the organic compound is glucose.

7. The method of claim 2 in which the organic compound is fructose.

8. The method of claim 2 in which sucrose is added to the reaction mixture after initiation of the reaction.

9. The method of claim 2 in which the initial ratio of the organic compound to sucrose is in the range of 0.1 to 10.

10. The method of claim 9 in which sucrose is added gradually to the reaction mixture after initiation of the reaction.

References Cited in the file of this patent

UNITED STATES PATENTS 2,392,258    Owen  ------------------ Jan. 1, 1946

OTHER REFERENCES

Evans et al.: Bacterial Polysaccharides (Reprint from Adv. in Carbohydrate Chemistry, vol. 11, Academic Press), Scientific Report Series, No. 6, Sugar Research Foundation, Inc., N. Y. April 1947, Article pp. 203–233: pp. 211, 216, 217 relied upon.

Hehre et al.: Jour. Bact. 55., 55 (1948) pages 197–208, pages specifically relied upon are 204–205.